United States Patent
LeVasseur et al.

(10) Patent No.: US 9,948,585 B2
(45) Date of Patent: Apr. 17, 2018

(54) SPLIT-ARCHITECTURE MESSAGE PROCESSING SYSTEM

(71) Applicant: Cirius Messaging Inc., Vancouver (CA)

(72) Inventors: Thierry LeVasseur, Vancouver (CA); Philippe Richard, Vancouver (CA)

(73) Assignee: Cirius Messaging Inc., Vancouver, BC (CA)

( * ) Notice: Subject to any disclaimer, the term of this patent is extended or adjusted under 35 U.S.C. 154(b) by 315 days.

(21) Appl. No.: 14/702,494

(22) Filed: May 1, 2015

(65) Prior Publication Data
US 2016/0323216 A1    Nov. 3, 2016

(51) Int. Cl.
*G06F 15/16* (2006.01)
*H04L 12/58* (2006.01)
*H04L 29/06* (2006.01)

(52) U.S. Cl.
CPC ...... *H04L 51/066* (2013.01); *H04L 29/06578* (2013.01); *H04L 29/06591* (2013.01); *H04L 51/08* (2013.01); *H04L 51/12* (2013.01); *H04L 51/26* (2013.01)

(58) Field of Classification Search
CPC ........ H04L 29/06578–29/06605; H04L 51/00; H04L 51/08–51/14; H04L 63/0227–63/0263
See application file for complete search history.

(56) References Cited

U.S. PATENT DOCUMENTS

| | | | | |
|---|---|---|---|---|
| 7,117,533 B1* | 10/2006 | Libenzi | ............... | H04L 63/0236 709/206 |
| 7,546,234 B1* | 6/2009 | Deb | .................... | G06F 17/2785 704/4 |
| 8,023,408 B2* | 9/2011 | Herrmann | ............... | H04L 47/10 370/229 |
| 8,407,335 B1* | 3/2013 | Church | ............... | G06F 11/0709 709/218 |
| 2003/0105825 A1* | 6/2003 | Kring | ...................... | H04L 29/06 709/206 |
| 2007/0297327 A1* | 12/2007 | Strom | .................... | H04L 67/322 370/230 |
| 2012/0036207 A1* | 2/2012 | Cole | ...................... | G06Q 10/10 709/206 |
| 2013/0340029 A1* | 12/2013 | De Armas | ............... | H04L 63/20 726/1 |

* cited by examiner

*Primary Examiner* — Brendan Higa
(74) *Attorney, Agent, or Firm* — Alleman Hall Creasman & Tuttle LLP (57) ABSTRACT

A message processing device with a split-architecture is described that allows for flexible control over data flow while enabling optimal processing based on available system resources. In one particular example, messages are processed in two stages prior to transmission to a destination. A cursory evaluation of each message determines whether a deeper level of processing is to be performed using additional resources. Then, messages capable of transmission with no perceivable delay may be transmitted directly, whereas messages to be processed using greater resources are directed to a workflow pipeline engine for more expensive processing at a later stage. The result is a low latency system allowing for efficient resource management, whose architecture is scalable and readily extendible, for example, to increase resources available during periods of high data flow.

20 Claims, 7 Drawing Sheets

SPLIT-ARCHITECTURE MESSAGE PROCESSING SYSTEM

BACKGROUND

Messaging systems such as instant messaging clients or e-mail servers may process hundreds of millions to billions of messages daily. To handle high volume data flows, processing elements may be distributed and decentralized over a network for reliable message delivery. However, a corresponding high operational overhead exists for setting up and configuring tools across the network; and additional complexities arise since data streams must be managed and processed across the network. These complexities are further confounded when messages received are transformed from one internet protocol into a different protocol during processing before the routing and message delivery.

SUMMARY

A message processing device is herein described having a split-architecture and configured to allow for a multiplicity of messaging protocols as well as flexible control over data flows across various data streams while enabling optimal message processing based on available system resources. In one particular example, the message processing device is a secure message gateway employed in a corporate entity that processes messages and transmits the messages processed to a destination. The device performs a cursory evaluation of each incoming message to determine whether a deeper level of processing is necessary based on the content of the message and whether an alternate transmission protocol may be performed. Then, messages capable of transmission without additional resources or transformations, and with no perceivable processing delay may be transmitted directly, whereas messages processed using greater resources or transformations are directed to a workflow pipeline engine for the more expensive processing at a later stage. As one example, an e-mail message including no attachments may be processed in real-time whereas a message including one or more attachments may be more thoroughly scanned to assess whether a virus threat exists for the attached files. As another example, a message to a trusted partner with a defined security clearance may result in the message being delivered over an encrypted messaging channel at a predetermined time when the recipient is available to accept it. According to the present disclosure, the message processing device may thus process these e-mail messages at a deeper level, which is performed at a later stage. The result is a low latency system configured for efficient resource management. One advantage of the system described is a high degree of scalability, which results in a readily extendible system whose resources can be increased during periods of high data flow.

In one particular example, the message processing device is a secure message gateway configured to receive messages and transmit the messages received to a destination. According to one embodiment described, the secure message gateway comprises a message engine configured to receive the message from a messaging client; a message parser configured to parse the message and create a metadata header describing properties used to define processing criteria rules for the message; a pipeline requester configured to determine a pipeline identifier from the metadata header based on the processing criteria rules for the message; a workflow pipeline engine configured to receive the message and the pipeline identifier, launch a pipeline based on the pipeline identifier, and create a modified message by passing the message through the pipeline, the pipeline configured to alter characteristics of the message; and a routing engine configured to receive the modified message and transmit the modified message to a destination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

A split-architecture network introduces separation between control and forwarding components within the network. In this way, these elements are decoupled and controlling elements on servers may be in different locations from the forwarding elements. Information collected from controllers may be used to distribute data streams to the appropriate forwarding components via switches. For example, a forwarding table may be populated with entries comprising a rule defining matches for fields in packet headers; an action associated to the flow match; and a collection of statistics on the flow. The use of a split-architecture enables the simplification of switches and shifts the network intelligence into a number of controllers that oversee the switches.

Figure 1:
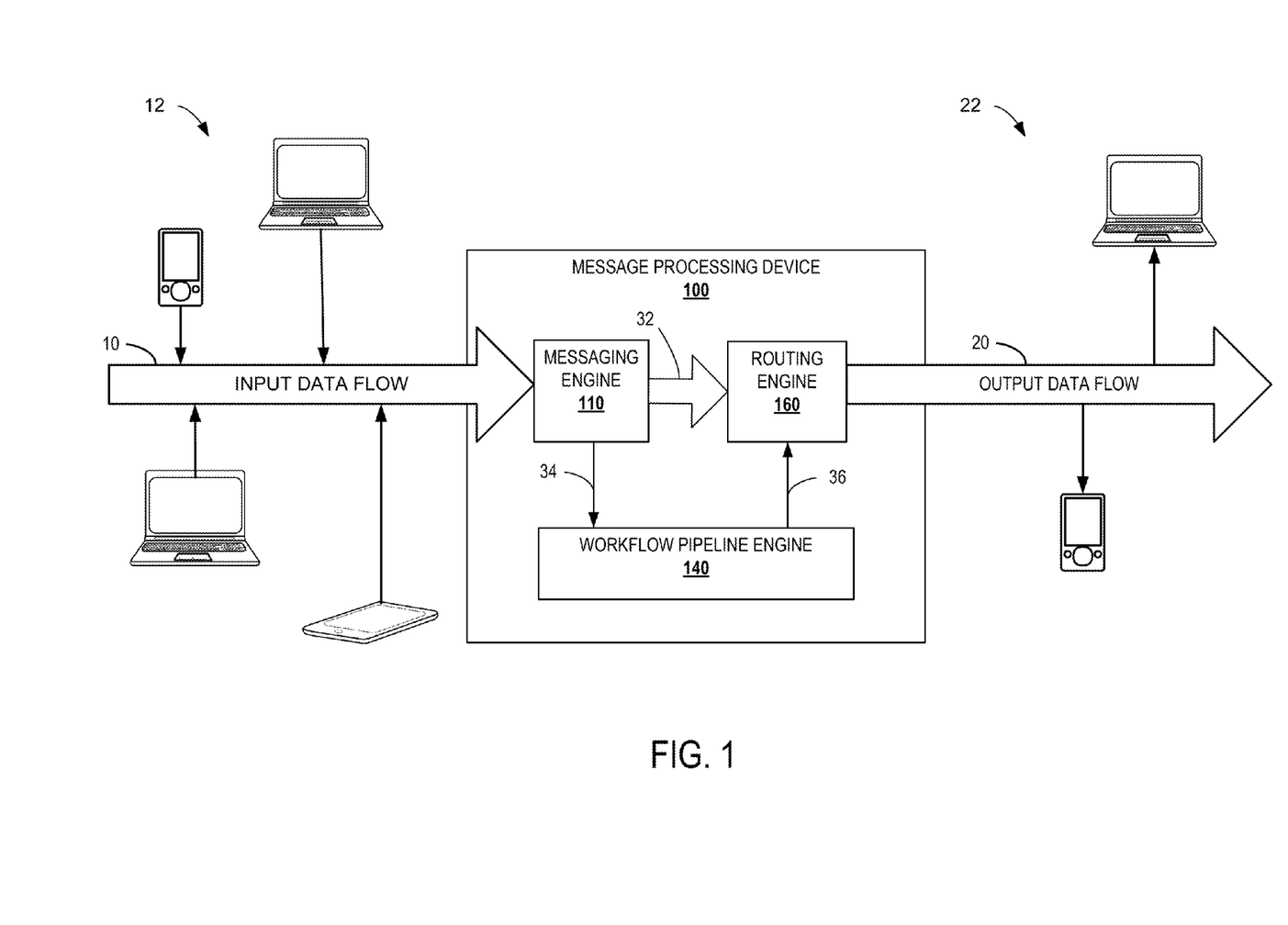
FIG. 1 illustrates an example data flow for a secure messaging gateway processing device.

FIG. 1 illustrates an example data flow through message processing device 100, e.g., a secure messaging gateway. Messaging engine 110 within the secure messaging gateway may be configured to receive a message from a client. For simplicity, input data flow 10 comprising input from a plurality of devices 12 is shown flowing into the secure messaging gateway. Once received, messaging engine 110 may quickly analyze each message, and direct the messages according to processing steps to be performed for the message.

For example, 80% of the messages within input data flow 10 may be messages falling below a size threshold (e.g., less than 10 kbytes) that can be processed directly without performing a deeper message scan. These messages may be directly processed and thereby transmitted with no perceivable delay in processing time. High volume flow 32 is shown reflecting the increased data flow that is directly processed and directed to routing engine 160 for transmission to a destination. Alternatively, the remaining 20% of input data flow 10 may comprise messages to be processed at a deeper level (e.g., size larger than 10 kbytes that include an attachment). Messaging engine 110 may be configured to direct these messages into workflow pipeline engine 140, as indicated by low volume flows 34 and 36 entering and exiting the workflow pipeline engine, respectively. Although the pipeline is depicted by a single box in FIG. 1, workflow pipeline engine 140 may include two or more components that work cooperatively to allow increased flexibility and performance.

As described in greater detail below, handlers and a pipeline requester may be included and used to schedule the deeper level of processing (e.g., a deep scan), as well as the transmission from an outbound queue. Routing engine 160 may be configured to transmit the messages stored in the outbound queue to a plurality of destinations 22 via output data flow 20. As described herein, the split-architecture may be synchronously operated to allow for input data flows to be processed more optimally based on system resources available. In this way, schedulers and/or handlers may be utilized to coordinate processing activities in the workflow pipeline engine while the directly processed data flow is also coordinated therewith. When configured in this way, messages may be processed in a highly efficient manner for delivery to an intended destination with low latency.

Figure 2:
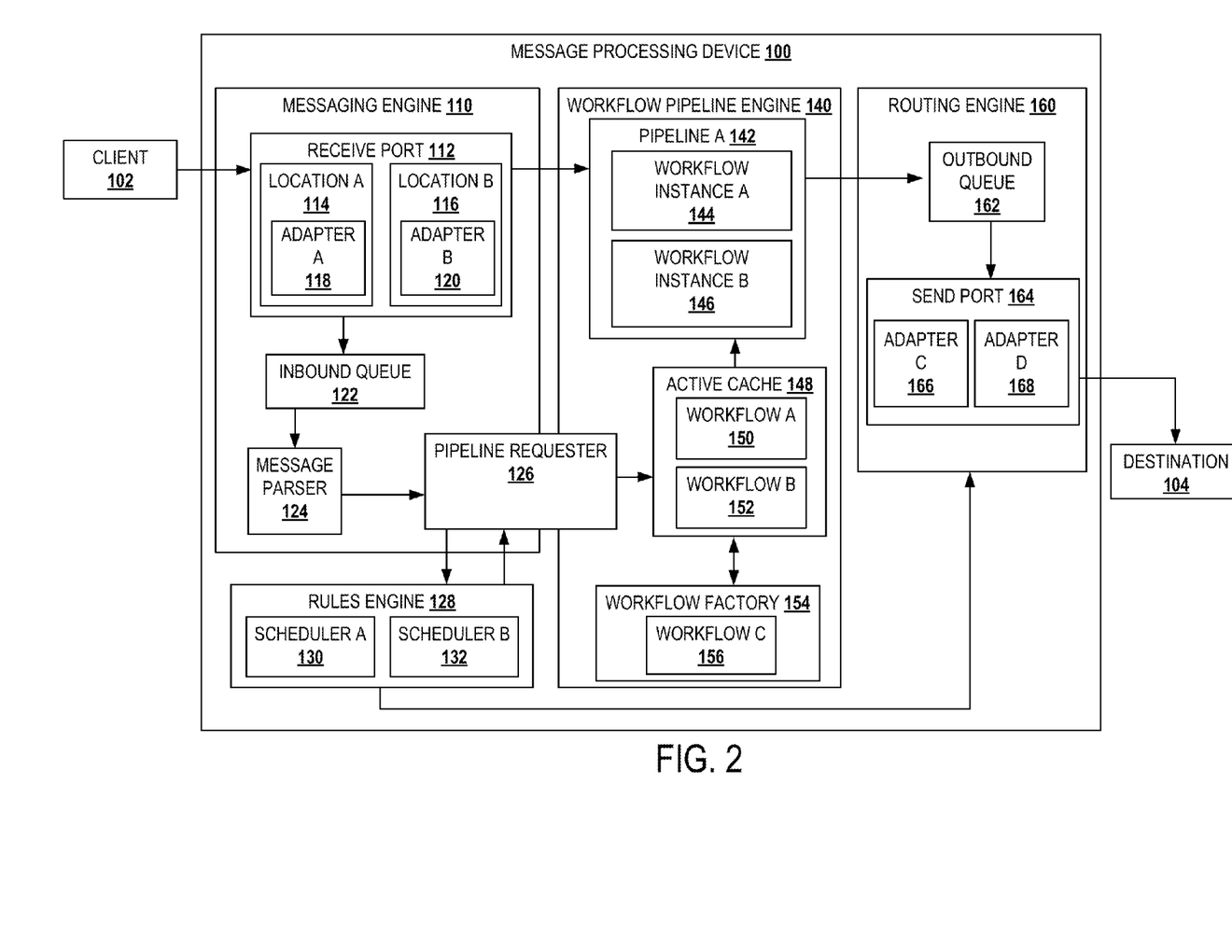
FIG. 2 schematically shows a block diagram describing major components and processes of the system.

FIG. 2 schematically shows a block diagram of message processing device 100 that is described in terms of an exemplary secure messaging gateway. The secure message gateway is configured to receive a message from a messaging client 102 and transmit the message to a destination 104. For example, a plurality of users within a corporate entity may communicate with one another and clients outside of the organization via various messaging protocols (e.g., e-mail, instant messaging, texting, dropbox cloud storage and file synchronization, blogging, voice over IP, etc. . . . ). Message processing device 100 may be configured to process these messages in a protocol independent format for delivery to an intended destination. Moreover, because some messaging formats like e-mail utilize greater system resources than others, a split-architecture message processing device allows for such messages, e.g., message with large attachments, to be scanned at a deeper level, to assess whether a virus is present. In addition, the deep scan can occur at a later stage of processing to conserve and/or coordinate system resources.

Scheduling resource intensive tasks for processing at a later time allows a higher volume of messages to be processed on demand using reduced system resources. In this way, the bulk of the data flow may be delivered with no perceivable delay, which allows for efficient system processing. Conversely, messages using a greater portion of the resources are directed to a workflow pipeline engine for more expensive processing that occurs, for example, at an off-peak time when the user demand on the system is reduced.

The exemplary message processing system provided has a modular design. Thus, the system may include modular services hosted by one or more processors that are configured to monitor system activities. Monitoring services provide for managed control while running the services since the monitor service advantageously maintains system integrity when separate modules are deployed or distributed across one or more devices within the system. Said differently, the monitor service maintains the integrity of a logical (distributed) workflow instance of the system. For example, the monitor service may provide a remote application programming interface (API) that is used for provisioning, configuring, and coordinating individual service operations.

Message processing device 100 further includes messaging engine 110 that is configured to receive messages from messaging clients. The messaging engine may process messages received regardless of protocol using a message parser 124. Message parser 124 parses each message while creating a metadata header for each message that describes properties used to define processing criteria rules for the message. That is, each message may be processed by a set of rules based on the metadata header created by message parser 124.

Message headers (e.g., cleartext, SMTP, secure mail, etc.) may include information such as a message ID. For example, an instant message may include a conversation and message ID that identifies different messages within a conversation. Program logic and/or rules may thus be developed to identify keywords or other information that is used to request specific processing steps. For example, a parser may operate like a bloom filter and identify whether an element is a member of a set based on a probabilistic assessment of the data structure. In some instances, a processing element requested may speed up operations and thereby use available system resources more efficiently.

Based on the processing criteria rules for a message, pipeline requester 126 may further determine a pipeline identifier to attach to the message from the metadata header. For example, an e-mail message having an attachment above a threshold (e.g., greater than 10 Mbytes) may be quickly assessed by rules engine 128 for a deeper level of processing via a virus scan. When an incoming message packet (or data stream) matches a particular rule or set of rules, an associated action may be performed on the packet. A rule contains key fields from several headers in the protocol stack, for example Ethernet MAC addresses, IP address, IP protocol, TCP/UDP port numbers as well as the incoming port number. To define a flow, all the available matching fields may be used. But it is also possible to use rules for a subset of the available fields.

Workflow pipeline engine 140 may be configured to receive messages and a pipeline identifier, and launch a pipeline based on the pipeline identifier. In this way, workflow pipeline engine 140 may perform intensive workflows based on a pipeline identifier. In the exemplary configuration provided, the workflow pipeline engine comprises two parts; the pipeline requester and pipeline processor. The pipeline requester may be configured to run in-process with both message engine 110 (e.g., an inbound service) and routing engine 160 (e.g., an outbound service) to create pipeline requests. Alternatively, the pipeline processor may run on one or more devices based on a queue whose job listings are managed for lifecycle management. One advantage of the configuration shown is an enhanced processing performance of the processing pipeline by virtue of increased scalability and resource availability that may be flexibly brought on-line during periods of high data flow.

For example, a pipeline identifier may indicate that a deep scan of the e-mail attachment is to be performed. Therefore, workflow pipeline engine 140 may schedule the e-mail scan for a later stage of processing. As another example, a document in an e-mail may include a watermark indicating that the document is not to be widely distributed. As described herein, the document may be quarantined until an administrator (e.g., a legal professional) overrides the quarantine and allows further processing and transmission of the document. As such, in some instances, the processing may be a manual processing performed by a credentialed individual that is trained to perform the inspection. Based on the pipeline identified, in some instances, the workflow pipeline engine may create a modified message by passing the message through the pipeline, the pipeline configured to alter characteristics of the message.

Thereafter, routing engine 160 may be further configured to receive the modified message from the pipeline engine and transmit the modified message to a destination. Alternatively, routing engine 160 may also receive directly processed messages that are transmitted without additional processing in the pipeline.

Returning to messaging engine 110. A receive port 112 is included therein that is configured to receive messages from one or more messaging clients. For simplicity, the receive port includes one or more receive locations (e.g., locations A and B shown at 114 and 116, respectively), although other configurations are possible. Each receive location may further include at least one adapter (e.g., adapters A and B shown at 118 and 120, respectively) that defines a communication method and/or protocol used to connect to and receive data from an external client.

Inbound queue 122 is configured to receive messages from receive port 112 that are further processed accordingly and sent to message parser 124. According to the description provided, the inbound queue may be configured to operate in a stateless manner in which the inbound queue does not require state information from the message processing device in order to receive and send the message to the message parser. Said differently, the inbound queue may process messages independently of data format and or transmission protocol. For instance, messages may be sent over SMTP protocols, HTTP and/or HTTPS (or any other TCP/IP channel) and processed within message processing device 100. Message parser 124 further creates the metadata header by mapping the base components of the message to a standardized message construct.

With regard to the rules engine 128, which may be configured to receive the metadata header from pipeline requester 126 and communicate therewith, a pipeline identifier may be determined based on the processing criteria for the message. As one example, the processing criteria may include one or more content-based keywords or phrases in the message or message line of the header, perhaps in addition to the presence of an attachment, as described above. For example, a lexical analysis of the content of an e-mail message may indicate a pattern to be analyzed at a deeper level in the workflow pipeline engine. Schedulers A and B shown at 130 and 132, respectively, may coordinate the timing of the deeper inspection based on current or expected resource usage. Alternatively, if a message passes the analytical tests provided by the rules engine, the messaging engine or rules engine may be configured to route the message directly to routing engine 160 where the message is incorporated into outbound queue 162 for delivery to the destination. When messages are processed directly, the messages are transmitted with no further modification of the message, which uses additional system resources.

To identify a time when message are to be processed at a deeper level, rules engine 128 may engage one or more schedulers included therein (e.g., scheduler A 130 and scheduler B 132). In this way, a scheduler also referred to as a handler may decide whether additional processing is to be performed via the pipeline, and in particular, the type of processing to be performed. As one example, scheduler A 130 may be configured to identify a message property like origin of message or subject line. Then, based on the message property, the scheduler may request, e.g., a virus scan or other specific task like data encryption and/or malware detection scan. In some instances, a scheduler may be written by a third party, and therefore be a third party API. A system configured according to the present description may flexibly incorporate this scheduler into rules engine 128 for increased processing capability. In other words, scheduler A 130 may be written by a first developer, such as the message processing system host, whereas scheduler B 132 is written by a third party security client that specializes in, for example, virus scanning detection. Subsequent to scheduling, pipeline requester 126 may synchronously direct the messages identified into workflow pipeline engine 140 to perform the resource intensive activities identified.

System deployments are conceivable where an implemented system hosts virtual configurations for different customers. Virtual configurations allow for a message assessment upon receipt, followed by identification of a customer environment (e.g., a customer specific set of processing rules, a customized scheduler or handler, a specified processing protocol, etc.) that is used for processing messages before transmission to a destination. In this way, the system may be flexibly configured for processing messages according to a specific processing protocol based on a particular set of criteria that is associated with or requested by a customer.

Resource intensive processing occurs in workflow pipeline engine 140. As noted above, pipeline requester 126 may coordinate and deliver messages to be processed more deeply into the pipeline where various pipelines are engaged or assembled to perform the additional processing steps. A pipeline is a linear series of steps (or stages) that can be executed to more thoroughly process the messages based on an identified criteria. Examples of workflow pipelines include deep virus scans, encryption methodologies and application of messaging filters.

As illustrated, the workflow pipeline processor may include two or more components that allow for an increased flexibility and/or performance. With this arrangement, the pipeline requester may be configured to handle the schedulers and distribution of workflow instances hosted by a plurality of services present within the system. In turn, the pipeline service may host handler processors that load handlers in the context of processing pipelines. The pipeline service may allow multiple workflow instances and multiple processors that run on one or more devices to be instantiated and managed by the monitor service. With this arrangement, the system may be configured as a mesh network having a network topology in which each node (or mesh node) relays data through the network while cooperatively distributing data within the network.

In one exemplary implementation, the pipeline service is configured to process jobs from a queue with pending routing requests that are added by one or more handlers. Then, pipeline processors may process items from the queue based on a desired transmission protocol. For example, an SMTP processor may process SMTP relay requests from the queue. In the event a processor instance or the service hosting an instance becomes unstable (e.g., due to a degraded system component or failure event), the monitor service may advantageously kill the instance and/or restart the workflow instance processing before transmission to a destination. The monitor service may also be configured to collect performance data from one or more pipeline processors that allow additional services and/or processors to be brought online responsive to the performance data collected.

Workflow pipeline engine 140 further comprises active cache 148 that is configured to receive a workflow and pipeline identifier, and to launch the appropriate pipeline from workflows stored in the active cache based on the pipeline identified. For simplicity, two workflows A and B are shown at 150 and 152, respectively. Active cache 148 may be configured to automatically initiate new requests to the update cached file objects or workflows without additional user intervention. In some instances, requests may be activated based on the length of time an object has been cached or was last retrieved from the object's source location.

A workflow pipeline may already exist and reside within the workflow pipeline engine. When a pipeline already exists, active cache 148 may launch the pipeline and direct the workflow into the pipeline for the additional processing. For example, workflow A and workflow B may be directed into pipeline A 142, which generates two different workflow instances indicated as workflow instance A 144 and workflow instance B 146, respectively. Alternatively, if no workflow exists for a pipeline identified, workflow factory 154 may be engaged that is configured to assemble a pipeline. For this reason, workflow instance C 156 is shown in workflow factory 154. Workflow factory 154 may assemble a pipeline, for example, by invoking a particular collection of files to perform the processing identified by the pipeline identifier. Thereafter, workflow C 156 may be sent back to the active cache for additional processing. After processing, workflow C 156 may be directed to the routing engine 160 for delivery to destination 104. Likewise, workflow instance A 144 and workflow instance B 146 may also be directed to routing engine 160 for delivery to destination 104 after processing in pipeline A 142.

In some embodiments, message processing device 100 may implement a publish-subscribe model to attain workflows that are used during message processing in the pipeline. In this way, the system may be configured to subscribe to one or more personal email networks and, during start-up of the message processing device, obtain one or more workflows published by the one or more personal email networks, the workflows defining the runtime behavior of the message processing device. Workflows obtained may then be stored in the active cache of the workflow pipeline engine for processing based on the pipeline identifier, which may be updated to reflect the available status of the pipeline during message processing. Alternatively, an existing workflow may be modified in the active cache of the workflow pipeline engine based on the workflows obtained from the one or more personal email networks.

Routing engine 160 comprises an outbound queue 162 for receiving modified messages from workflow pipeline engine 140, in addition to unmodified messages from rules engine 128, which in some instances may be included within messaging engine 110. According to the description provided, routing engine 160, which may perform the outbound service, may be deployed on a single device or across a plurality of devices. A monitor service may then be included that is configured to control activation and lifetime of individual instances residing within the routing engine. In other words, outbound cache may automatically initiate and update cached file objects or workflows without additional user intervention prior to message delivery.

The routing service from the outbound processor may also be configured to allow multiple instances and multiple processors that run on one or more devices. Thus, the routing services may be instantiated and managed by the monitor service. With this arrangement, the system may be configured as a mesh network with a network topology in which each node relays data within the network. Thereby, one or more of the nodes may cooperatively distribute data within the network to allow a logical system instance that is managed as a single unit.

As one example, the routing service is configured to process jobs from a queue with pending routing requests added by different processors. Then, routing processors may process items from the queue based on a desired transmission protocol. For example, an SMTP outbound processor may process SMTP relay requests from the queue. In the event a processor instance or the service hosting an instance becomes unstable (e.g., due to a compromised component or failure event), the monitor service may advantageously kill the instance and/or restart the instance processing before transmission to a destination. The monitor service may also be configured to collect routing performance data from one or more processors that allow additional services and/or processors to be brought online responsive to the routing performance data collected.

Send port 164 includes a plurality of protocol adaptors (e.g., adaptors C and D shown at 166 and 168, respectively) that are configured to connect and transmit the messages to destination 104. In some instances, routing engine 160 may be configured to send messages over different adapters and via different protocols than received. In this way, message processing device 100 may be agnostic to protocol format.

Although not shown in FIG. 2, message processing device 100 may include a scripting engine, which provides for the implementation of scripts in a scripting language. Inclusion of a scripting engine advantageously allows schedulers to create scripts that are executed as part of the processing pipeline. Additionally or alternatively, inclusion of a scripting engine may allow for dynamic configuration management via one or more scripts that are generated by the scripting engine. Dynamic configuration management increases system flexibility, particularly as new components are added to the system. One advantage of a scripting engine is that changes across the system may be implemented or run as a subset of transactions (e.g., via one or more transactions), which allows for version control and future proofing activities that are provided by the scripting engine.

Figure 3:
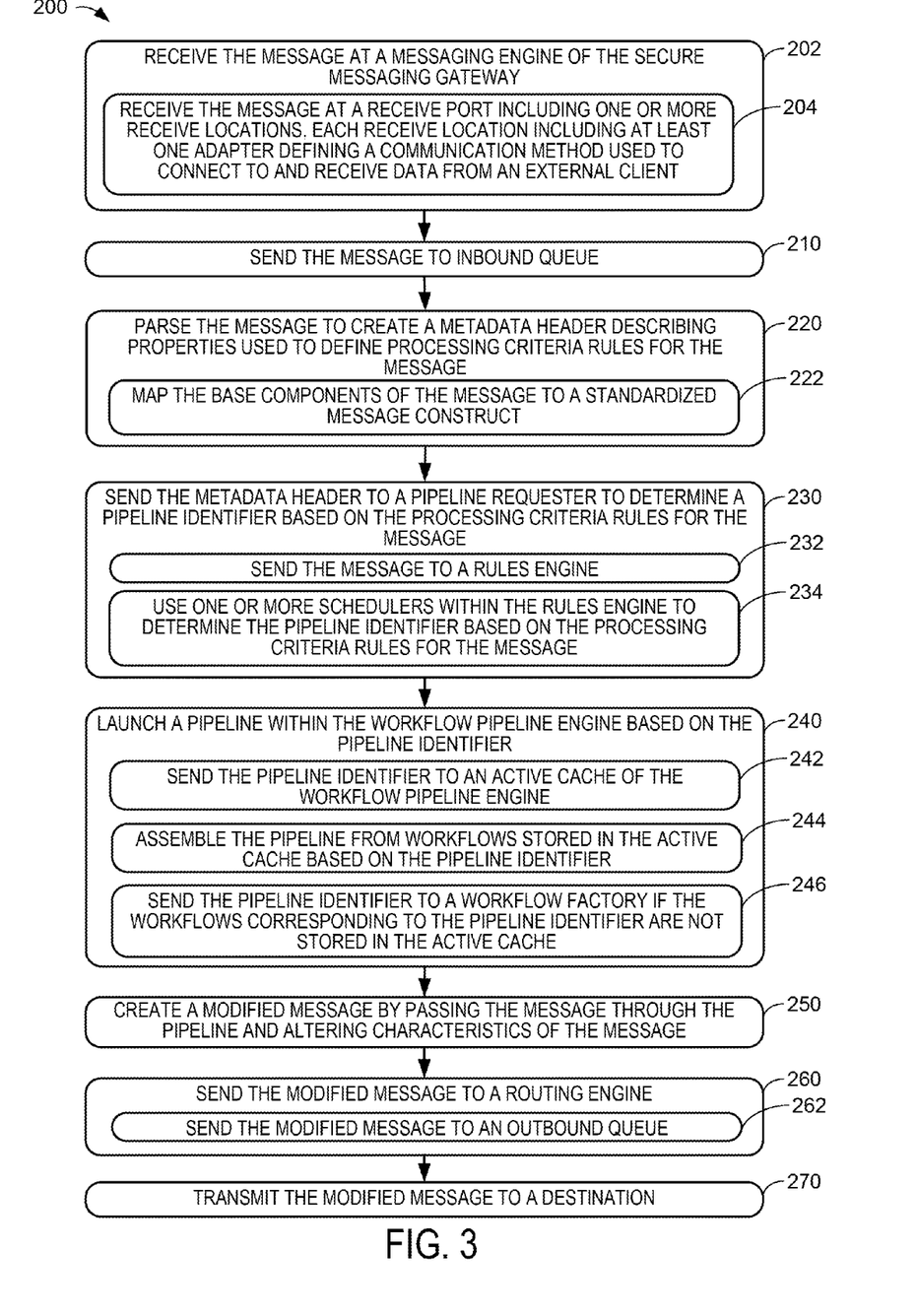
FIGS. 3 and 4 show example flow charts illustrating process flows for the example system of FIG. 2.
Figure 4:
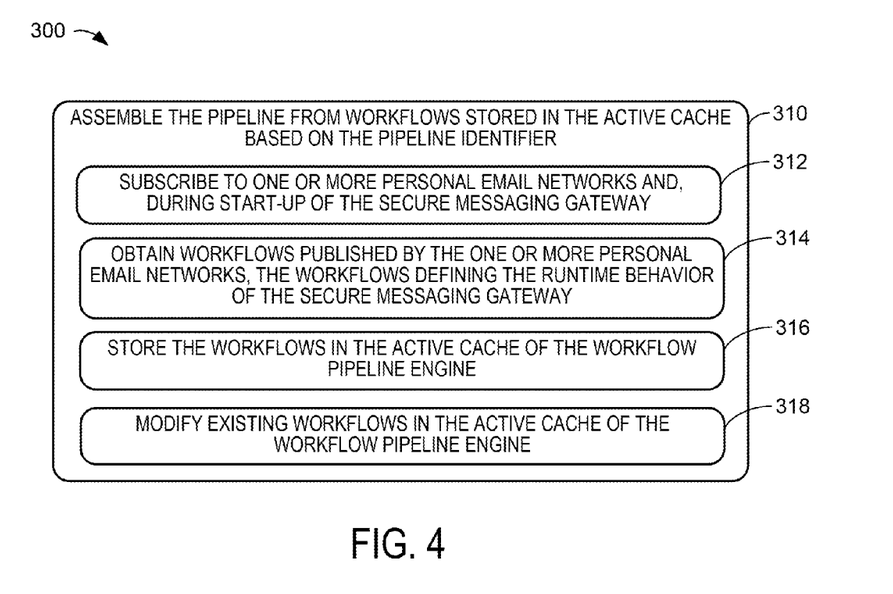

Turning to a description of the methods enabled by such a system, FIGS. 3 and 4 show example flow charts illustrating process flows for processing the data according to an example system according to the present disclosure.

FIG. 3 shows method 200 for processing a message in message processing device 100, e.g., a secure message gateway. At box 202, method 200 includes receiving the message at a messaging engine of the secure messaging gateway. For example, at box 204, method 200 includes receiving the message at a messaging engine of the secure messaging gateway and further comprises receiving the message at receive port 112 including one or more receive locations (e.g., 114 and 116), each receive location including at least one adapter (e.g., 118 and 120) defining a communication method used to connect to and receive data from an external client, such as plurality of clients 12.

At box 210, method 200 includes sending the message to an inbound queue, such as inbound queue 122.

At box 220, method 200 includes parsing the message to create a metadata header describing properties used to define processing criteria rules for the message. For example, the base components of the message may be mapped to a standardized message construct, as shown at box 222.

At box 230, the method further includes sending the metadata header to a pipeline requester to determine a pipeline identifier, the pipeline identifier determined based on the processing criteria rules for the message. At 232, the method further comprises sending the message to a rules engine for processing based on the processing criteria rules. If a message is to be processed at a deeper level, one or more schedulers within the rules engine may be engaged to determine the pipeline identifier based on the processing criteria rules established for the message, as shown at box 234. In this way, the method may include sending the message and pipeline identifier to a workflow pipeline engine. However, if further processing is not to be performed, method 200 may alternately transmit the message to an intended destination without modifying the message.

However, if deeper processing is identified, method 200 may include launching a pipeline within the workflow pipeline engine based on the pipeline identifier, as indicated at box 240. Launching a pipeline comprise sending the pipeline identifier to an active cache of the workflow pipeline engine along with the message to be processed, as indicated at box 242. In some instances, launching the pipeline may include assembling the pipeline from workflows stored in the active cache based on the pipeline identifier, as indicated at box 244. However, in other instances, launching a pipeline based on the pipeline identifier may include sending the pipeline identifier to a workflow factory if the workflows corresponding to the pipeline identifier are not stored in the active cache, as indicated at box 246.

Turning momentarily to FIG. 4 illustrating method 300 for assembling the pipeline, box 310 shows that the pipeline may be assembled from workflows stored in the active cache based on the pipeline identifier. For example, at box 312, method 300 may include using a subscription to one or more personal email networks, and during start-up of the message processing device (e.g., secure messaging gateway), obtaining workflows published by the one or more personal email networks, the workflows defining the runtime behavior of the secure messaging gateway, as shown at box 314. In this way, method 300 includes storing the workflows obtained in the active cache of the workflow pipeline engine. Alternatively, box 318 shows that method 300 may include modifying existing workflows in the active cache of the workflow pipeline engine.

Returning to FIG. 3, at box 250, method 200 includes creating a modified message by passing the message through the pipeline and altering characteristics of the message. Then, at box 260, method 200 further includes sending the modified message to a routing engine. Sending the modified message to a routing engine comprises incorporating the message into an outbound queue as shown at box 262, and sending the modified message to a protocol adapter within a send port, the protocol adapter configured to connect and transmit the modified message to the destination, as indicated at box 270.

Figure 5:
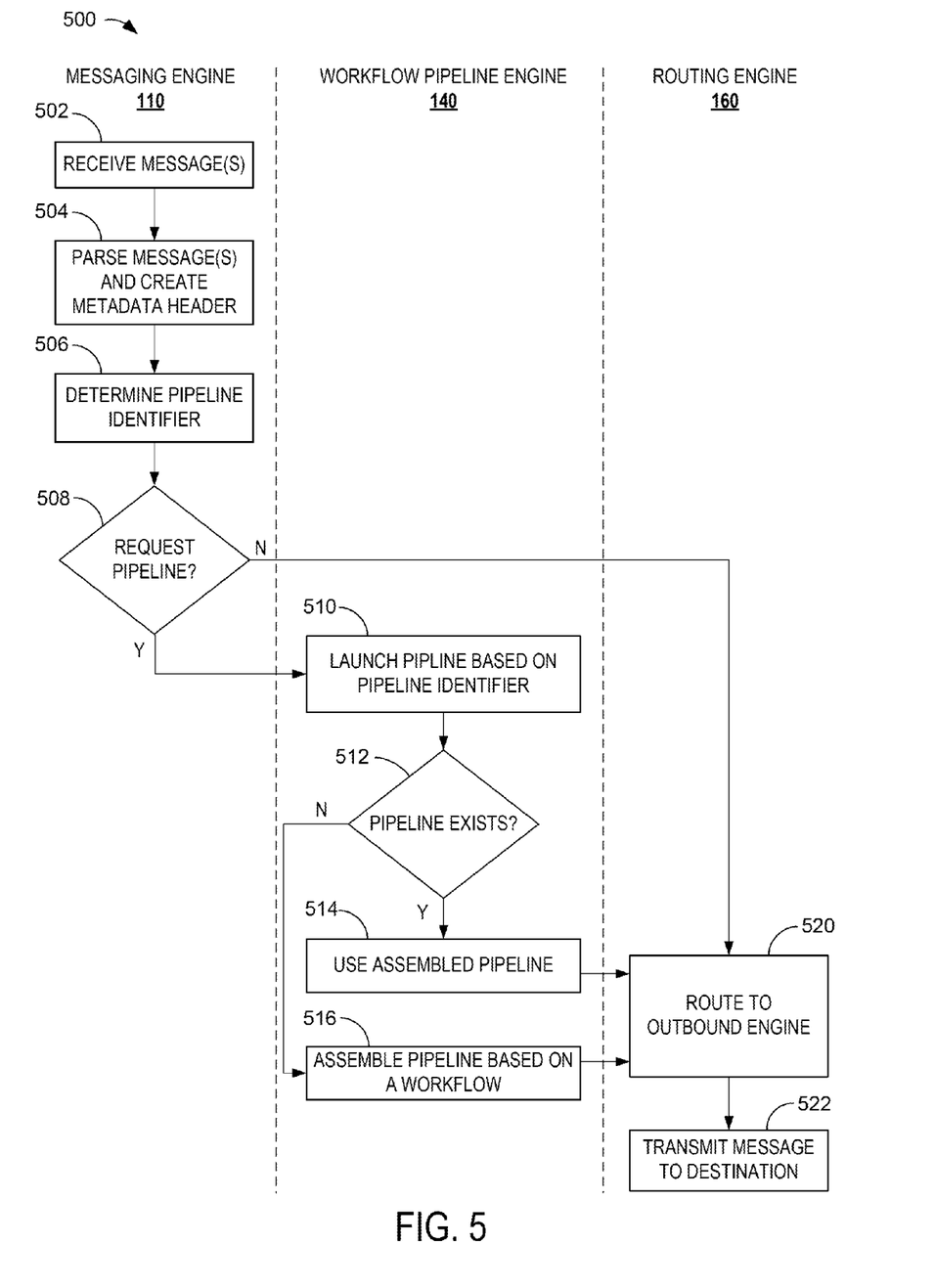
FIG. 5 shows an example flow chart for managing the data flow of the example system.

FIG. 5 shows an example flow chart 500 illustrating the flow of a message within the secure messaging gateway. Flow chart 500 also referred to as method 500 provides a method for processing a message upon entering the secure message gateway. At 502, the method comprises receiving the message at a messaging engine of the secure messaging gateway, wherein receiving the message further comprises receiving the message at a receive port including one or more receive locations, each receive location including at least one adapter defining a communication method used to connect to and receive data from an external client. Thereafter, method 500 includes sending the message to an inbound queue configured to process messages based on an identifier associated with the message.

At 504, the message is parsed to create a metadata header describing properties that define processing criteria rules for the message, the message parsing further comprising mapping the base components of the message to a standardized message construct. At 506, method 500 includes determining whether a pipeline identifier exists to execute the additional processing indicated via the workflow pipeline engine. For this reason, decision block at 508 is included and determines whether a pipeline is to be requested or the message processed directly. For example, a metadata header may be sent to a pipeline requester to determine a pipeline identifier based on the processing criteria rules for the message, wherein determining the pipeline identifier further comprises sending the message to a rules engine in some instances. Therein, one or more schedulers may be used to determine the pipeline identifier based on the processing criteria rules for the message.

If a message can be processed directly without requesting the pipeline, which uses additional system resources, the message may be directed to routing engine 520 where it is incorporated into the outbound queue. At 522, method 500 further includes transmitting the messages to a destination based on an ordering in the outbound queue. When messages received bypass the workflow pipeline engine, modifications of the messages do not occur. Therefore, a message received may be processed directly and transmitted to a destination with no perceivable delay in processing. During periods of high volume data flow, additional processing resources can be brought online and incorporated into the secure messaging gateway to help with the increased data flow.

Returning to decision block 508, if a pipeline identifier indicates that a message is to be processed via the workflow pipeline engine, at 510, the method includes launching a pipeline within the workflow pipeline engine based on the pipeline identifier. Launching the pipeline comprises sending the pipeline identifier to an active cache of the workflow pipeline engine. By passing the message through the pipeline, a modified message may be created by altering one or more characteristics of the message. If the pipeline exists, at 512, the method may use an assembled pipeline to process the message, as indicated at box 514. Alternatively, if a pipeline does not exist, a pipeline may be assembled based on the workflow, as indicated at box 516.

Assembling the pipeline from workflows stored in the active cache based on the pipeline identifier may comprise subscribing to one or more personal email networks and, during start-up of the secure messaging gateway; obtaining workflows published by the one or more personal email networks, the workflows defining the runtime behavior of the secure messaging gateway; storing the workflows in the active cache of the workflow pipeline engine; and/or modifying existing workflows in the active cache of the workflow pipeline engine. In some instances, the pipeline identifier may be sent to a workflow factory if the workflows corresponding to the pipeline identifier are not stored in the active cache. A workflow factory may be used to create a pipeline on demand based on the pipeline identifier.

As described above, the modified message is then directed to routing engine 520 and incorporated into the outbound queue for transmission to the intended destination. At 522 the method further includes transmitting the modified message to a destination based on an established ordering in the outbound queue.

Figure 6:
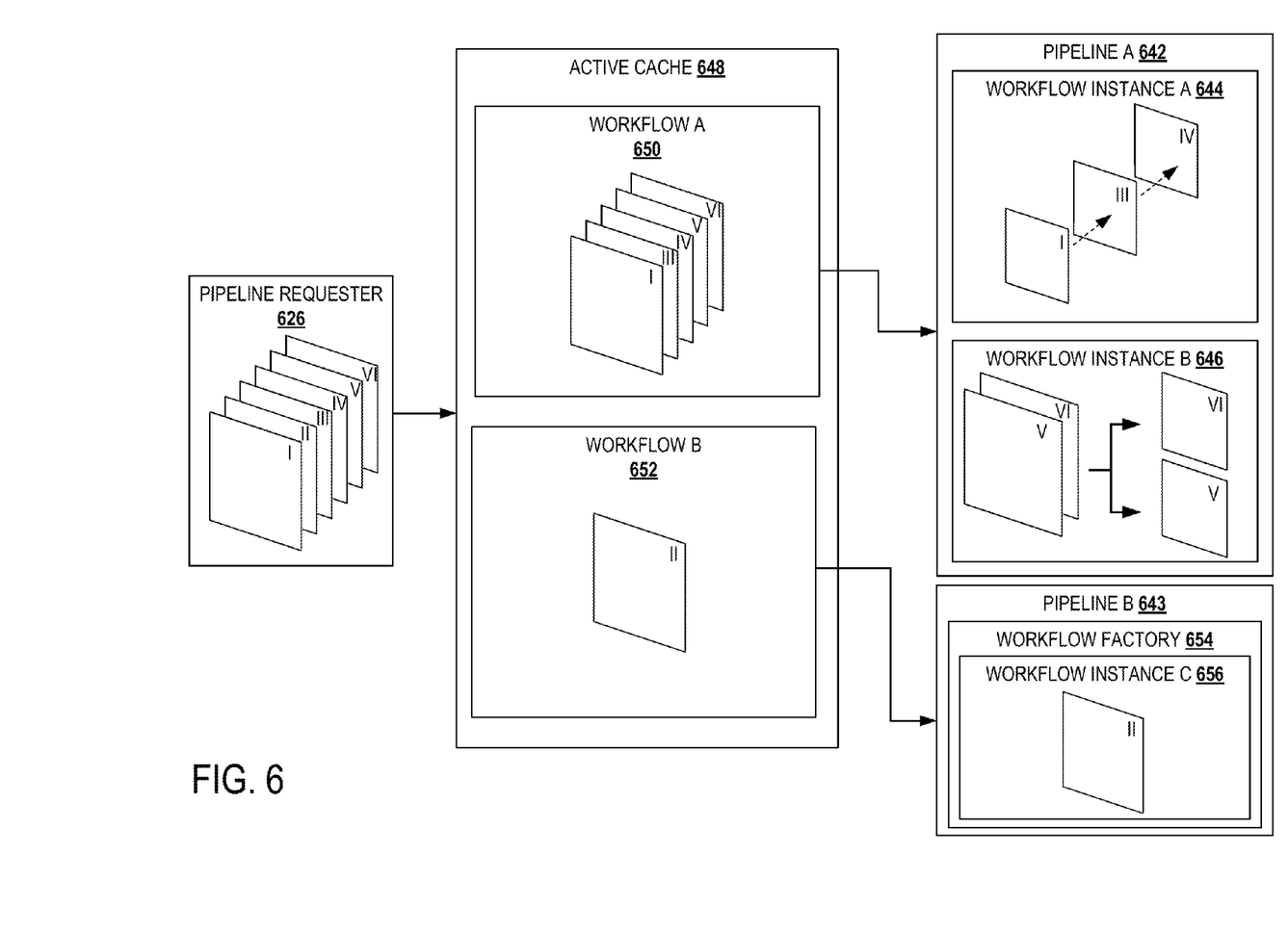
FIG. 6 illustrates an exemplary data flow directed to the workflow pipeline engine.

FIG. 6 illustrates an example pipeline data flow that occurs in the workflow pipeline engine. For simplicity, six messages denoted I to VI are identified for additional processing and stored in pipeline requester 626. These files include metadata headers from which pipeline identifiers are identified to indicate the pipeline to be used for processing the messages in the workflow pipeline engine. In this way, the pipeline requester may compile requests and construct the various pipeline workflows for further processing. In some instances, messages to be processed in the workflow pipeline engine may be disparate in origin, and come from different places, and via different protocols, but be processed in a single workflow pipeline. Alternatively, a default workflow (e.g., virus scan) may exist based on workflow rules that are executed upon request.

Upon entering the workflow pipeline engine, the six files are sent to active cache 648 that receives the workflow and pipeline identifier, and further launches the pipeline from workflows stored in the active cache based on the pipeline identifier. Active cache may automatically initiate new requests to update cached file objects or workflows without additional user intervention. Two example workflows A and B are shown at 650 and 652, respectively. Example workflow A 650 includes files I, III, IV, V, and VI, whereas workflow B 652 includes file II. Pipelines A and B are shown at 642 and 643, respectively, and may be launched for processing workflows according to the determined schedule and system resources used. Workflow A 650 is directed to pipeline A 642 whereas workflow B 652 is directed to pipeline B 643.

Exemplary pipeline A 642 is shown executing two different workflows. Workflow instance A 644 schematically illustrates serial processing wherein files I, III, and IV are efficiently processed in series, for example, because the files have a smaller size. Alternatively, workflow instance B 646 schematically illustrates execution via parallel processing wherein files V and VI are shown simultaneously processed. For instance, files V and VI may be large and so benefit from parallel processing to be expeditiously processed. As noted above, file scanning pipelines may already exist and reside in the workflow pipeline engine, which is indicated in pipeline A 642.

Exemplary pipeline B 643 illustrates an example where the pipeline does not reside in the workflow pipeline engine. Thus, the pipeline is first assembled before processing of the message occurs. For this reason, pipeline B 643 includes workflow factory 654. In some instances, the pipeline identifier may be sent to a workflow factory if the workflows corresponding to the pipeline identifier are not stored in the active cache. A workflow factory is used to create a pipeline on demand based on the pipeline identifier. Thereafter, workflow instance C 656 shows file II being processed using the assembled pipeline, and each of the files shown (e.g., I through VI) may be routed to the outbound queue for transmission to a destination.

Figure 7:
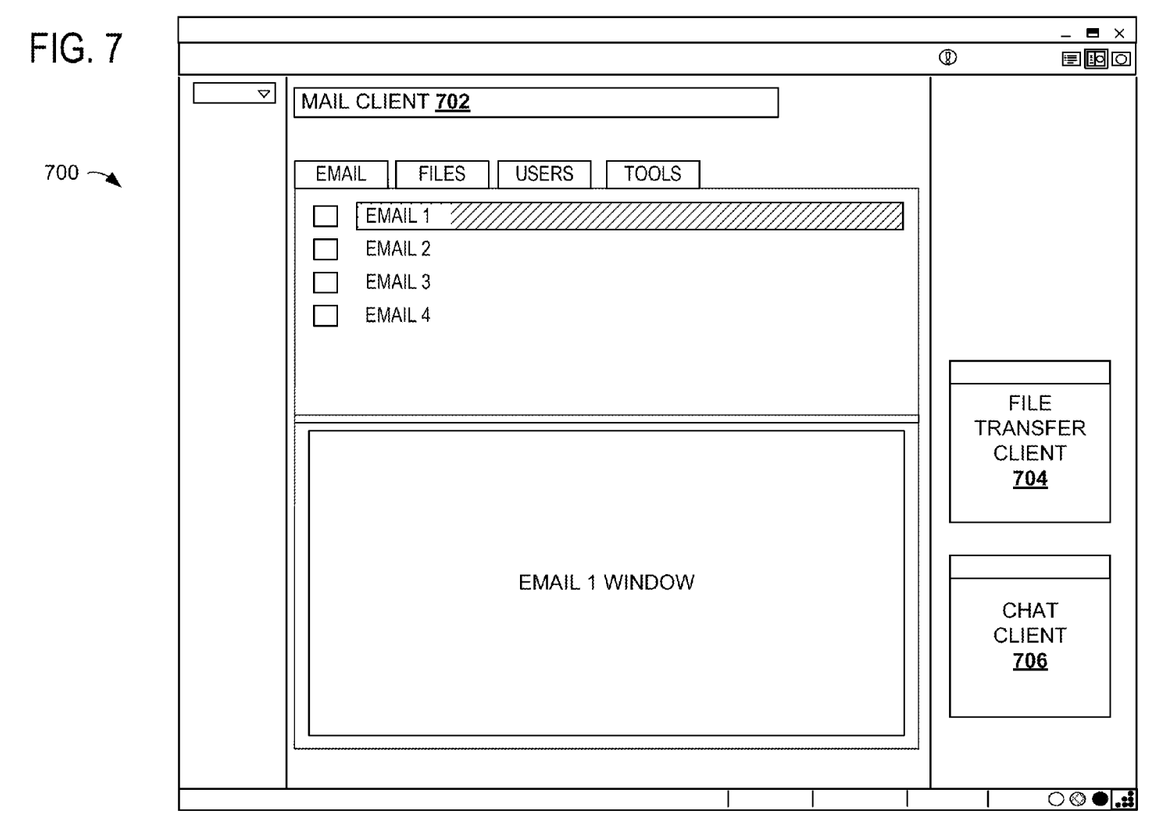
FIG. 7 shows an exemplary user interface for sending messages via the processing device during operation.

FIG. 7 shows an example UI 700 for use with the message processing system. Because messages are processed independently of format or protocol, the interface includes three different messaging clients being simultaneously engaged for use with the system according to the present description. For example, mail client 702, file transfer client 704 (e.g., FTP), and chat client 706 may be used simultaneously. The e-mail client may be used for creating, exchanging, and viewing e-mail messages. Existing e-mail clients include MS Outlook, Eudora Mail, and Lotus Notes. As used herein, an e-mail client refers to any program (e.g. PC-based, web-based, PDA-based, etc.) that allows for the creation and management of e-mail messages through existing e-mail protocols such as SMTP. Instant messaging (IM) is a type of online chat that offers real-time text transmission over the Internet (e.g., HTTP or HTTPS). Short messages are typically transmitted when a user selects "send". As described above, the secure messaging gateway may be configured to receive messages independent of format or protocol for transmission to a destination.

In this way, a cursory evaluation or quick scan may be performed that inexpensively assesses the various properties of a message without accessing additional lookups. Thus, the system may minimize external resources used for processing high volume data flows in some instances. Early inexpensive assessments provide for a simple processing without invoking additional resources of the system. Then, deeper scans and processing steps may be scheduled and performed at a later stage based on the available system resources. As one example, an e-mail transmission lasting a few hundred milliseconds may be processed with no appreciable slowdown in transmission speed. Thus, the surface level evaluation of the message properties allows for quick processing without opening attachments or performing deeper level activities while triggers for the deeper scan are sought. If a deeper scan is not triggered, the system may perform the quick scan only, and simply transmit the message to a destination without using additional resources, which allows for the resources of the system to be optimized with respect to data flow and usage.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy used.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed, as well as any and all equivalents thereof.

The invention claimed is:

1. A secure message gateway implemented on a message processing device configured to receive a message from a messaging client and transmit the message to a destination, comprising:
   a processor; and
   a memory storing software modules to be executed by said processor, the software modules comprising:
   a message engine configured to receive the message from the messaging client;
   a message parser configured to parse the message and create a metadata header describing properties used to define processing criteria rules for the message;
   a pipeline requester configured to determine a pipeline identifier from the metadata header based on the processing criteria rules for the message;

a workflow pipeline engine configured to receive the message and the pipeline identifier, launch a pipeline based on the pipeline identifier, and create a modified message by passing the message through the pipeline, the pipeline configured to alter characteristics of the message; and a routing engine configured to receive the modified message and transmit the modified message to a destination.

2. The secure message gateway of claim 1, wherein the messaging engine further comprises:

a receive port configured to receive the message from the messaging client, the receive port including one or more receive locations, each receive location including at least one adapter defining a communication method used to connect to and receive data from an external client; and an inbound queue configured to receive the message from the receive port and send the message to the message parser.

3. The secure message gateway of claim 2, wherein the inbound queue is further configured to operate in a stateless manner in which the inbound queue does not require state information from the secure messaging gateway in order to receive and send the message to the message parser.

4. The secure message gateway of claim 1, wherein the message parser is further configured to create the metadata header by mapping the base components of the message to a standardized message construct.

5. The secure message gateway of claim 1, further comprising:

a rules engine configured to receive the metadata header from the pipeline requester and to determine the pipeline identifier based on the processing criteria for the message.

6. The secure message gateway of claim 1, wherein the workflow pipeline engine further comprises:

an active cache configured to receive the pipeline identifier and launch the pipeline from workflows stored in the active cache based on the pipeline identifier.

7. The secure message gateway of claim 1, further comprising:

a workflow factory configured to assemble the pipeline if the workflows corresponding to the pipeline identifier are not stored in the active cache.

8. The secure message gateway of claim 1, further comprising a publish-subscribe model configured to:

subscribe to one or more personal email networks and, during start-up of the secure messaging gateway, obtain workflows published by the one or more personal email networks, the workflows defining the runtime behavior of the secure messaging gateway; and store the workflows in the active cache of the workflow pipeline engine.

9. The secure message gateway of claim 8, wherein the publish-subscribe model is further configured to:

modify existing workflows in the active cache of the workflow pipeline engine based on the workflows obtained from the one or more personal email networks.

10. The secure message gateway of claim 1, wherein the routing engine further comprises:

an outbound queue configured to receive the modified message from the workflow pipeline engine; and a send port including a plurality of protocol adaptors configured to connect and transmit the modified message to the destination.

11. A method of processing a message in a secure message gateway, comprising:

receiving the message at a messaging engine of the secure messaging gateway;

parsing the message to create a metadata header describing properties used to define processing criteria rules for the message;

sending the metadata header to a pipeline requester to determine a pipeline identifier, the pipeline identifier determined based on the processing criteria rules for the message;

sending the message and the pipeline identifier to a workflow pipeline engine;

launching a pipeline within the workflow pipeline engine based on the pipeline identifier;

creating a modified message by passing the message through the pipeline and altering characteristics of the message;

sending the modified message to a routing engine; and transmitting the modified message to a destination.

12. The method of claim 11, wherein receiving the message at a messaging engine of the secure messaging gateway further comprises:

receiving the message at a receive port including one or more receive locations, each receive location including at least one adapter defining a communication method used to connect to and receive data from an external client; and sending the message to an inbound queue.

13. The method of claim 11, wherein parsing the message to create a metadata header further comprises:

mapping the base components of the message to a standardized message construct.

14. The method of claim 11, wherein sending the metadata header to a pipeline requester to determine a pipeline identifier further comprises:

sending the message to a rules engine; and using one or more schedulers within the rules engine to determine the pipeline identifier based on the processing criteria for the message.

15. The method of claim 11, wherein launching a pipeline based on the pipeline identifier further comprises:

sending the pipeline identifier to an active cache of the workflow pipeline engine; and assembling the pipeline from workflows stored in the active cache based on the pipeline identifier.

16. The method of claim 15, wherein launching a pipeline based on the pipeline identifier further comprises:

sending the pipeline identifier to a workflow factory if the workflows corresponding to the pipeline identifier are not stored in the active cache.

17. The method of claim 15, wherein assembling the pipeline from workflows stored in the active cache based on the pipeline identifier:

subscribing to one or more personal email networks; and during start-up of the secure messaging gateway, obtaining workflows published by the one or more personal email networks, the workflows defining the runtime behavior of the secure messaging gateway; and storing the workflows in the active cache of the workflow pipeline engine.

18. The method of claim 17, wherein storing the workflows in the active cache of the workflow pipeline engine further comprises:

modifying existing workflows in the active cache of the workflow pipeline engine.

19. The method of claim 11, wherein sending the modified message to a routing engine further comprises:
sending the modified message to an outbound queue; and
sending the modified message to a protocol adapter within a send port, the protocol adapter configured to connect and transmit the modified message to the destination.

20. A method of processing a message in a secure message gateway, comprising:
receiving the message at a messaging engine of the secure messaging gateway, wherein receiving the message further comprises receiving the message at a receive port including one or more receive locations, each receive location including at least one adapter defining a communication method used to connect to and receive data from an external client;
sending the message to a inbound queue;
parsing the message to create a metadata header describing properties used to define processing criteria rules for the message, wherein parsing the message further comprises mapping the base components of the message to a standardized message construct;
sending the metadata header to a pipeline requester to determine a pipeline identifier based on the processing criteria rules for the message, wherein determining the pipeline identifier further comprises:
sending the message to a rules engine; and
using one or more schedulers within the rules engine to determine the pipeline identifier based on the processing criteria rules for the message;
launching a pipeline within the workflow pipeline engine based on the pipeline identifier, wherein launching the pipeline further comprises:
sending the pipeline identifier to an active cache of the workflow pipeline engine;
assembling the pipeline from workflows stored in the active cache based on the pipeline identifier;
wherein assembling the pipeline from workflows stored in the active cache further comprises:
subscribing to one or more personal email networks and, during start-up of the secure messaging gateway;
obtaining workflows published by the one or more personal email networks, the workflows defining the runtime behavior of the secure messaging gateway;
storing the workflows in the active cache of the workflow pipeline engine; and
modifying existing workflows in the active cache of the workflow pipeline engine; and
sending the pipeline identifier to a workflow factory if the workflows corresponding to the pipeline identifier are not stored in the active cache;
creating a modified message by passing the message through the pipeline and altering characteristics of the message;
sending the modified message to a routing engine; and
transmitting the modified message to a destination.

* * * * *